(12) United States Patent
Slogsnat

(10) Patent No.: US 11,255,704 B2
(45) Date of Patent: Feb. 22, 2022

(54) SENSOR SYSTEM AND METHOD FOR OPERATING A SENSOR SYSTEM

(71) Applicant: Robert Bosch GmbH, Stuttgart (DE)

(72) Inventor: David Slogsnat, Tuebingen (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 16/765,469

(22) PCT Filed: Dec. 28, 2018

(86) PCT No.: PCT/EP2018/097134
§ 371 (c)(1),
(2) Date: May 19, 2020

(87) PCT Pub. No.: WO2019/137820
PCT Pub. Date: Jul. 18, 2019

(65) Prior Publication Data
US 2020/0278223 A1    Sep. 3, 2020

(30) Foreign Application Priority Data
Jan. 11, 2018   (DE) .......................... 102018200379.3

(51) Int. Cl.
*G01D 18/00*    (2006.01)
*G06F 1/3206*   (2019.01)
*G06F 1/3234*   (2019.01)

(52) U.S. Cl.
CPC .......... *G01D 18/006* (2013.01); *G06F 1/3206* (2013.01); *G06F 1/3234* (2013.01); *H04Q 2209/883* (2013.01)

(58) Field of Classification Search
CPC ................ G06F 1/3206; G06F 1/3234; H04Q 2209/883
See application file for complete search history.

(56) References Cited

U.S. PATENT DOCUMENTS

| 2003/0040881 A1* | 2/2003 | Steger ................... G16H 40/40 702/123 |
| 2006/0035590 A1* | 2/2006 | Morris .................. G06F 1/3271 455/41.2 |

(Continued)

FOREIGN PATENT DOCUMENTS

| DE | 102013107707 A1 | 1/2015 |
| DE | 102014019492 A1 | 6/2016 |
| DE | 102015209129 B3 | 11/2016 |

OTHER PUBLICATIONS

International Search Report for PCT/EP2018/097134, dated Mar. 20, 2019.

*Primary Examiner* — Manuel L Barbee
(74) *Attorney, Agent, or Firm* — Norton Rose Fulbright US LLP; Gerard Messina

(57) ABSTRACT

A sensor system including one sensor element for acquiring at least one measured variable, a circuit system for operating the sensor device and for generating sensor data based on the sensor signals, and a configuration data memory for configuration data. The sensor system is able to be alternatively operated in at least in an active mode, and in a sleep mode. The circuit system is configured in such a way that the memory content of the configuration data memory is independent of the respective operating mode of the sensor system, so that the stored configuration data are maintained in a sleep mode, and the sensor system is configured in such a way that the at least one part that is switched to a currentless state in the sleep mode is reconfigured on the basis of the stored configuration data when a change to an active mode is initiated.

12 Claims, 4 Drawing Sheets

(56) References Cited

U.S. PATENT DOCUMENTS

| | | | |
|---|---|---|---|
| 2009/0254203 A1* | 10/2009 | Gerold | B25C 1/08 |
| | | | 700/87 |
| 2012/0185186 A1 | 7/2012 | Banerjee et al. | |
| 2013/0103204 A1 | 4/2013 | Stefanski et al. | |
| 2013/0222271 A1 | 8/2013 | Alberth et al. | |
| 2015/0063072 A1* | 3/2015 | Deng | H01M 4/661 |
| | | | 367/134 |
| 2015/0333752 A1 | 11/2015 | Motz | |

* cited by examiner

SENSOR SYSTEM AND METHOD FOR OPERATING A SENSOR SYSTEM

FIELD

The present invention relates to a sensor system.

In addition, the present invention relates to a method for operating a sensor system.

Although the present invention can generally be used in different areas, the present invention is described with reference to sensor systems in the field of the Internet of Things.

BACKGROUND INFORMATION

Conventional sensor systems often have a plurality of operating modes, which may essentially be subdivided into two categories. For one, they may be subdivided into an operating mode in which the sensor system is actively operating with the aid of a sensor element, i.e., generating measured data, and for another, an operating mode in which the sensor system is inactive. One example of an actively operating sensor element is a sensor element that provides data on a continuous or cyclical basis. Inactive modes are often termed suspend modes or sleep modes. The latter modes are used to reduce the power consumption of the sensor system during times when no sensor data are generated or no data are required by the sensor system. For example, parts or areas of the sensor system are then no longer supplied with current in an effort to reduce the current consumption of the sensor system as a whole. Only the part of the sensor system that is required for a change to an active state is supplied with current.

If such sensor systems are used in what is termed the Internet of Things or in smart home applications, high demands are made on the energy consumption of these sensor systems since sensor systems of this type are often operated by a battery or a rechargeable battery, which is meant to be recharged or exchanged only after years.

SUMMARY

In one specific embodiment, the present invention provides a sensor system that has
a. at least one sensor element for sensing at least one measured variable in the form of electrical sensor signals,
b. a circuit system for operating the sensor device and for generating sensor data on the basis of the sensor signals, and
c. at least one configuration data memory for configuration data, with the sensor system being alternatively operable in different operating modes, i.e., at least
in an active mode in which sensor data are generated, and
in a sleep mode in which no sensor data are generated and at least one part of the sensor system is switched to a currentless state,
with
the circuit system being configured in such a way that the memory content of the at least one configuration data memory is independent of the respective operating mode of the sensor system, so that the stored configuration data are maintained in a sleep mode, and
the sensor system being configured in such a way that the at least one part that is switched to a currentless state in the sleep mode is reconfigured on the basis of the stored configuration data when a change to an active mode is initiated.

In an additional specific embodiment, the present invention provides a method for operating an example sensor system according to the present invention, and at least one part of the sensor system that is switched to a currentless state in a sleep mode is configured with the aid of configuration data stored in the configuration data memory when a change from a sleep mode to an active mode is initiated.

One of the advantages gained by example embodiments of the present invention is that the time that the sensor element requires for the complete startup, i.e., from the change from the sleep mode to the active mode and the start of measurements or the supply of measured data, is able to be shortened while the amount of energy consumed until the measurements are started or measured data are supplied is able to be reduced. In addition, the flexibility is increased because multiple operating modes are able to be made available. Another advantage is that because of the ever smaller structures in semiconductors and the simultaneously greater functionality, the energy consumption of a sensor system based thereon due to leakage currents is able to be reduced.

Additional features, advantages and further specific embodiments of the present invention are described below or are disclosed thereby.

According to one advantageous further development of the present invention, at least one interface for the communication with an external processing unit is provided and user-specific and/or application-specific configuration data are optionally able to be written to the at least one configuration data memory via the external interface, independently of the operating mode. One of the thereby achieved advantages is that configuration data are thus able to be written in a particularly flexible manner even during the sleep mode of the sensor system.

According to another development of the present invention, the circuit system is developed in such a way that when a change from a sleep mode to an active mode is initiated, the active mode is started. This offers the advantage of shortening the time until sensor data are supplied by the sensor system. An additional advantage is that an external communication with a processing unit is no longer required once the configuration of the sensor system has been concluded. In other words, the active mode is automatically started after the initialization of an active mode and the configuration of the sensor system.

According to another advantageous further development in accordance with the present invention, the sensor system is able to be operated in at least two active modes, which include a continuous operating mode and/or an operating-cycle mode. This offers the advantage that the sensor system is able to be flexibly operated in different active modes in accordance with the individual requirements. A continuous operating mode in particular is to be understood as a "continuous mode". An operating-cycle mode is to be understood as a "duty cycled mode", in particular.

According to another advantageous further development in accordance with the present invention, the sensor system is operable in at least two sleep modes, which differ from each other by the parts of the circuit system that are able to be switched to a currentless state, in particular at least one sleep mode in which an analog part of the circuit system is switched to a currentless state, at least one sleep mode in which a digital part of the circuit system is switched to a currentless state, and/or at least one sleep mode in which a data memory for sensor data is switched to a currentless state. This has the advantage that the sensor system is able to be operated in a flexible manner in different sleep modes depending on the requirements, e.g., with regard to the respective energy consumption.

According to another advantageous further development of the present invention, an interface is connected to the circuit system, and with its aid, a change in the operating mode is able to be initiated by an external processing unit. One of the advantages that results therefrom is that a simple and reliable control of the sensor system is possible, in particular a change of the respective operating modes.

According to another advantageous further development of the present invention, the circuit system is developed in such a way that information about the operating mode in which the sensor system is operated is able to be transmitted to the external processing unit by way of the interface. This allows for an increase in the reliability in that corresponding information about the current operating mode in which the sensor system is being operated is able to be made available to a processing unit or the like with the aid of an interface.

According to another advantageous further development of the present invention, the interface is embodied as a 12C, SPI or 13C interface. This is advantageous insofar as this makes it possible to provide a reliable communication via the interface.

According to an additional advantageous further development of the present invention, the sensor element is embodied as a micromechanical sensor element, in particular a micromechanical sensor element for sensing the pressure, acceleration, rate of rotation, orientation in space, temperature, humidity, gas composition and/or particle concentration. This is advantageous insofar as the sensor device is able to be made available in a flexible manner and the sensor element may be made available in a compact form.

According to another advantageous further development of the present invention, the circuit system is developed to provide multiple sleep modes and/or multiple active modes for operating the sensor system, with the modes differing by their energy consumption. They may also be considered sub-modes of the particular active and/or sleep mode that has the highest energy consumption. This is advantageous insofar as the operating mode is adaptable in an extremely flexible manner to the demands of a user with regard to the energy consumption. In addition, at least one of the modes may either be permanently preset or be modifiable by a user. If a certain sleep or active mode for the selection is fixedly preset, then a sensor element that is fully configured with regard to its possible operating modes is able to be made available to a user. In the same way, it is possible to produce different variants with regard to the selectable modes on the basis of the same implementation, which saves costs. If a corresponding sub-mode of the respective active and/or sleep mode is configurable by a user, then the user is able to operate the sensor system in the respective sub-mode in an extremely flexible manner according to the individual user requirements.

According to one advantageous further development of the example method according to the present invention, after the reconfiguration of the at least one part of the sensor system, the sensor system is operated in the active mode. Thus, an external communication with a processing unit following the completed configuration of the sensor system is no longer required. In other words, the active mode is automatically started after the initialization of an active mode and the configuration of the sensor system.

According to another advantageous further development of the present invention, the sensor system draws less than two microamperes in at least one sleep mode, in particular in a temperature range of at least 0°-65° C. This offers the advantage that the sensor system is particularly suitable for Internet of Things applications or applications that are wearable on the body such as smartwatches, and has a reduced energy consumption.

Additional important features and advantages of the present invention result the figures and the description herein.

It is understood that the aforementioned features and the features still to be described below may be used not only in the indicated combination but in other combinations as well or on their own without departing from the framework of the present invention.

Preferred developments and embodiments of the present invention are shown in the figures and described in greater detail in the following description; identical reference numerals relate to identical or similar or functionally equivalent components or elements.

DETAILED DESCRIPTION OF EXAMPLE EMBODIMENTS

Figure 1:
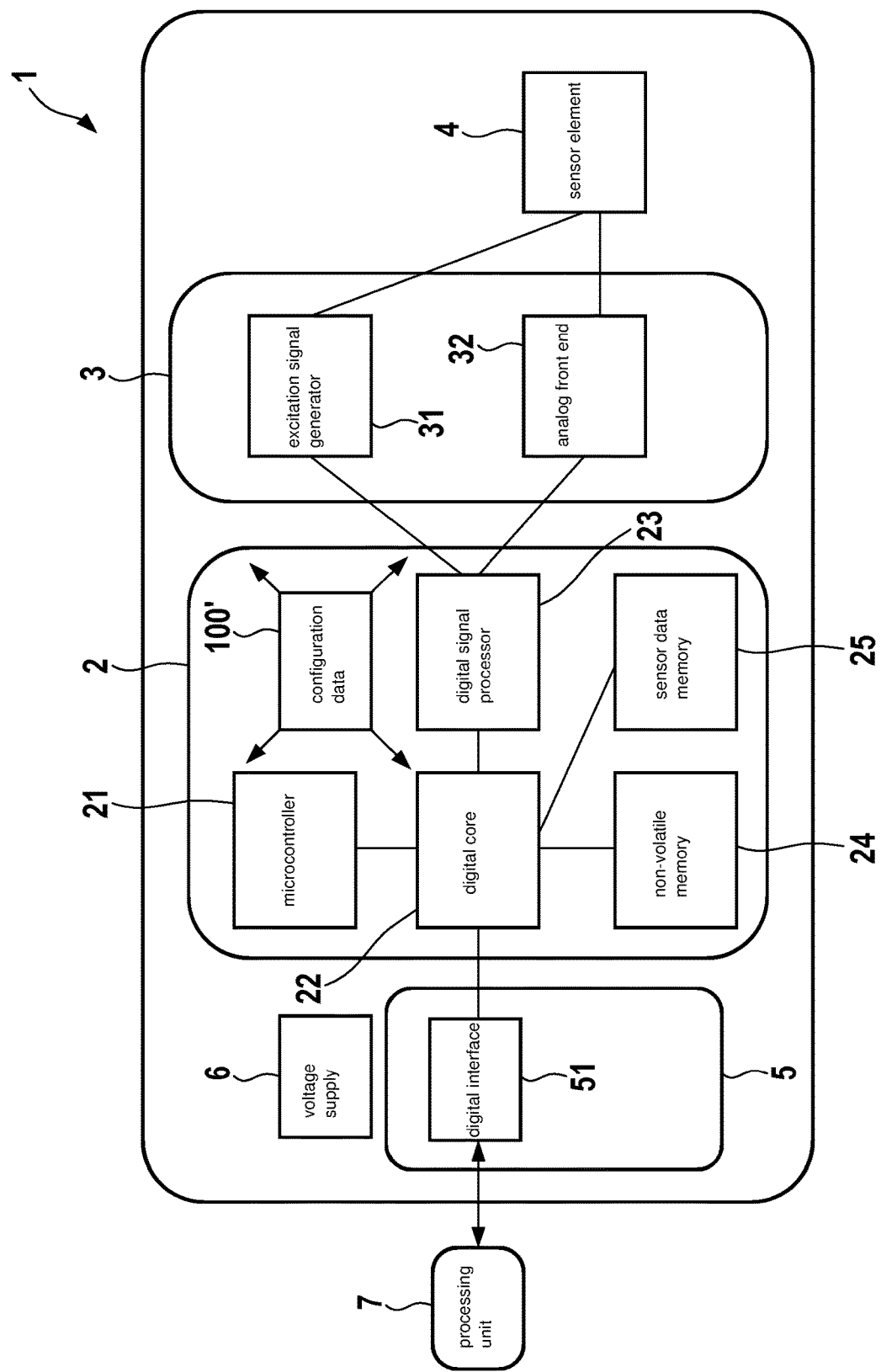
FIG. 1 shows a conventional sensor system in schematic form.

FIG. 1 shows a conventional sensor system in schematic form.

FIG. 1 shows a sensor system 1 in schematic form. Among others, sensor system 1 includes a digital part 2 and an analog part 3. Analog part 3 is switchable in this case, which means that it is able to be switched on and off, but digital part 2 is not, meaning that it is not able to be switched off but will always be supplied with energy, i.e., independently of the respective operating mode.

In detail, digital part 2 includes a digital core 22, which is connected to a microcontroller 21, a digital signal processor 23, a sensor data memory 25, in particular in the form of a first-in/first-out FIFO memory, and a non-volatile memory 24.

Configuration data 100' for the configuration of sensor system 1 are stored in a volatile memory, which is switched off when the sensor system is operated in a sleep mode.

Analog part 3 has an excitation signal generator 31 and an analog front end 32 including an analog-to-digital converter.

In addition, sensor system 1 includes a sensor element 4, which is connected to excitation signal generator 31 and analog front end 32. In the same way, sensor system 1 includes a part 5, which has a digital interface 51 that is connected to digital core 22 on the one hand and to a processing unit 7 on the other hand for an external communication. Part 5, too, is unable to be switched off. Sensor system 1 furthermore includes a voltage supply 6 for the supply of energy.

Figure 2:
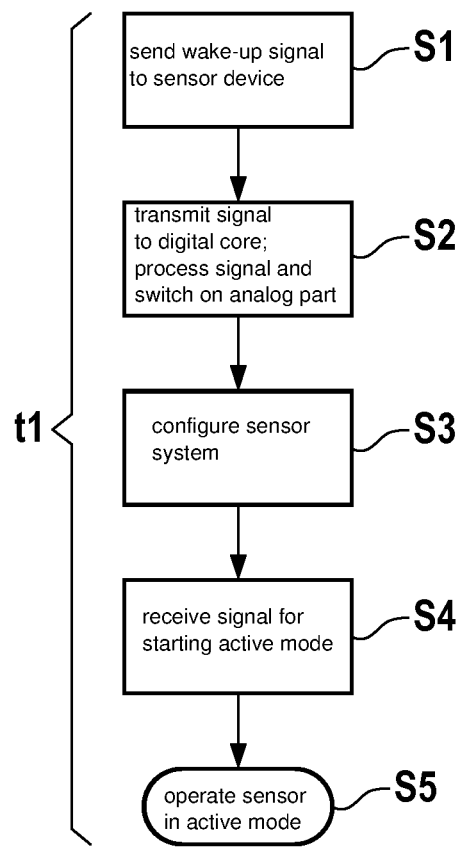
FIG. 2 shows steps of a conventional method during a change from a sleep mode to an active mode of a conventional sensor system.

FIG. 2 shows steps of a conventional method during the change from a sleep mode to an active mode of a conventional sensor system.

In FIG. 2, when sensor system 1 according to FIG. 1 is in a sleep mode SM and analog part 3 is switched off, a user first sends what is termed a wake-up signal to sensor device 1 with the aid of external processing unit 7 in a first step S1. Sensor system 1 receives the wake-up signal via interface 51 and transmits the signal to digital core 22. Digital core 22 processes the signal and then switches analog part 3 on so that it is supplied with energy. This requires a certain amount of time (reference numeral S2).

This is followed by a configuration of sensor system 1 by the user with the aid of external processing unit 7 in a third step S3 in that configuration data 100' are transmitted via interface 51. Configuration data 100' are made available to the components of sensor system 1 to be configured, i.e., as shown in FIG. 1, to all components of analog part 3 and microcontroller 21, digital signal processor 23 and digital core 22, for their configuration.

After the configuration of the components has been concluded, sensor system 1 receives a signal from the user via external processing unit 7 for starting the active mode in a fourth step S4. In a fifth step S5, sensor system 1 is then operated in the active mode, and sensor element 4 carries out measurements. In particular steps S2, i.e., the wake-up of sensor system 1, as well as S3, i.e., the configuration of sensor system 1, consume considerable time. In addition, sensor system 1 has to interact with the user during steps S1-S4, not only through the wake-up signal in step S1 but also by the configuration of sensor system 1 in step S3 and the starting of the active mode in step S4. In total, time t1 is required for the interaction.

Figure 3:
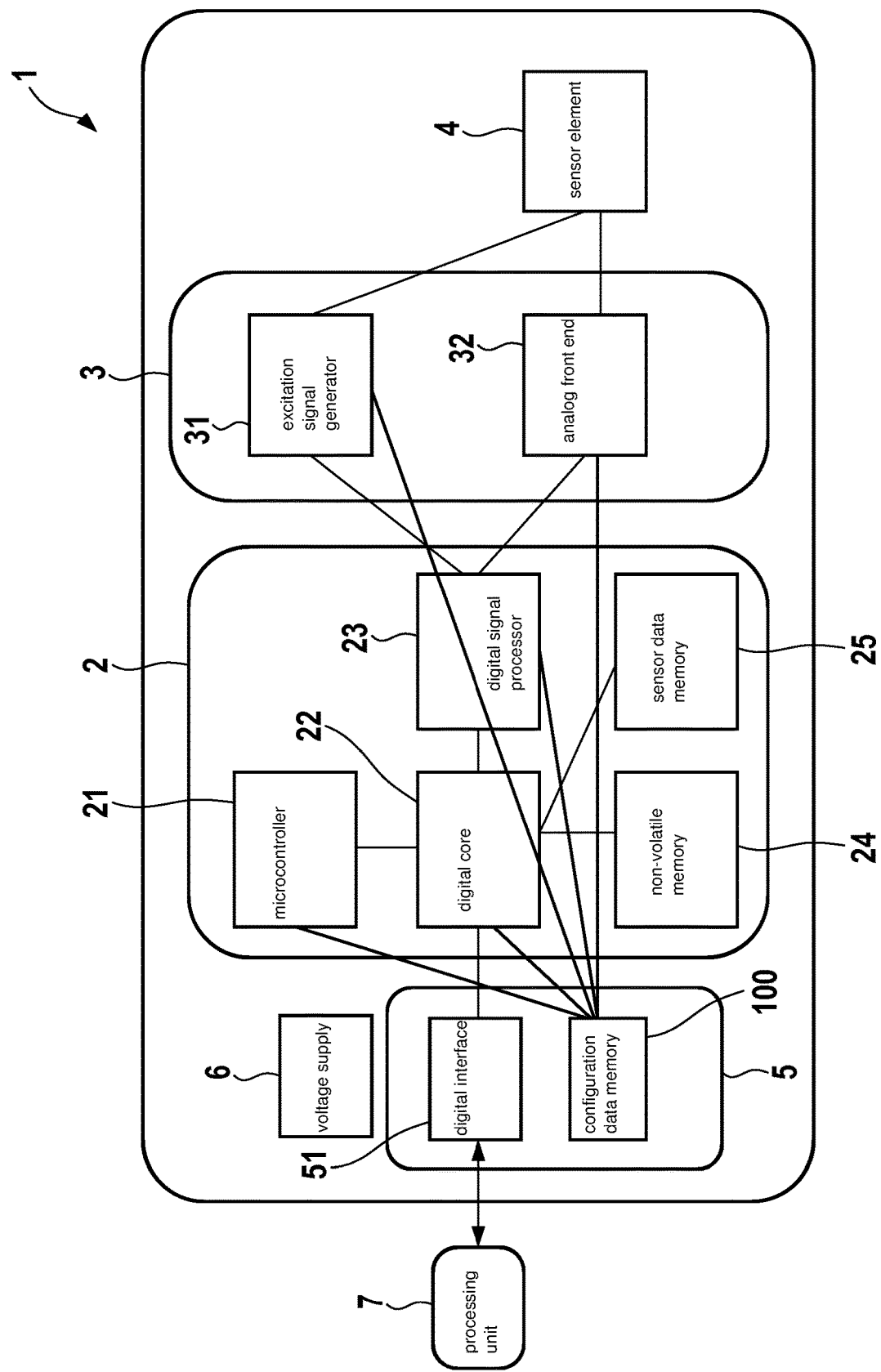
FIG. 3 shows a sensor system according to a specific embodiment of the present invention, in schematic form.

FIG. 3 shows a sensor system according to one specific embodiment of the present invention in schematic form.

In FIG. 3, a sensor system 1 according to FIG. 1 is essentially shown in schematic form. In contrast to sensor system 1 according to FIG. 1, in sensor system 1 according to FIG. 3 digital part 2 is now also switchable, or in other words, is able to be switched on and off. In addition, a configuration data memory 100 in part 5 is provided, which is not switchable, i.e., is always supplied with energy. Moreover, sensor data memory 25 may also be located in part 5 instead of in digital part 2, so that access to stored sensor data via interface 51 is possible also in a sleep mode of sensor system 1. The components of digital and/or analog part 2, 3 may also be developed in such a way that they are able to be switched off and on separately in each case. Also, groups of components may be defined or formed so that when the group is switched on or off, the respective components that are allocated to the group are switched on or off. In the same way, the illustrated components themselves may be provided with a separate energy supply in switched-off areas, e.g., be directly connected to interface 51 or voltage supply 6, so that they are switched off when the part is switched off, but are able to be switched on regardless of whether the part is switched off. In the same way, this may generally prevent such a component from being switched off when the corresponding part is switched off.

Figure 4:
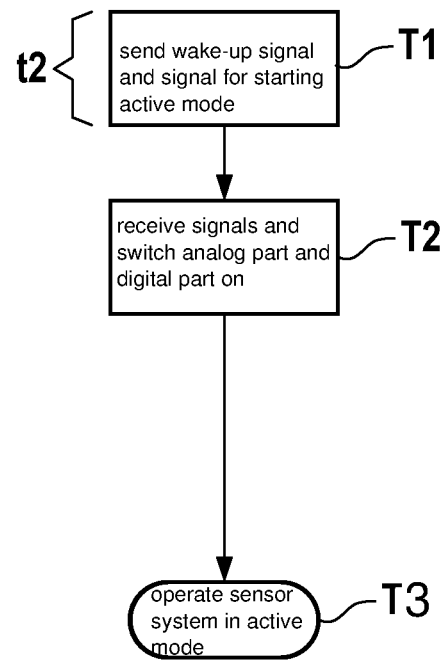
FIG. 4 shows steps of a method during a change from a sleep mode to an active mode of a sensor element according to a specific embodiment of the present invention.

FIG. 4 shows steps of a method during a change from a sleep mode to an active mode of a sensor system according to a specific embodiment of the present invention.

In FIG. 4, when the sensor system is in a sleep mode SM and analog part 3 as well as digital part 2 are switched off, a user first sends a wake-up signal and a signal for starting the active mode with the aid of external processing unit 7 to sensor system 1 in a first step T1. Sensor system 1 receives the two signals via interface 51 and subsequently switches analog part 3 and digital part 2 on so that they are supplied with energy. This requires a certain amount of time (reference numeral T2).

While analog and digital parts 3, 2 are switched on, they are configured using configuration data 100' from configuration data memory 100. In third step T3, sensor system 1 is operated in the active mode and carries out measurements with the aid of sensor element 4.

Since the active mode is automatically started immediately thereafter, time t2 required for the interaction with external processing unit 7 is considerably reduced. In other words, time t2 according to FIG. 4, during which sensor system 1 according to FIG. 3 interacts with a user, is much shorter than time t1 according to FIG. 2. An external configuration of sensor system 1, i.e., by a user, is not required because the configuration data are held in readiness also during the sleep mode.

Figure 5:
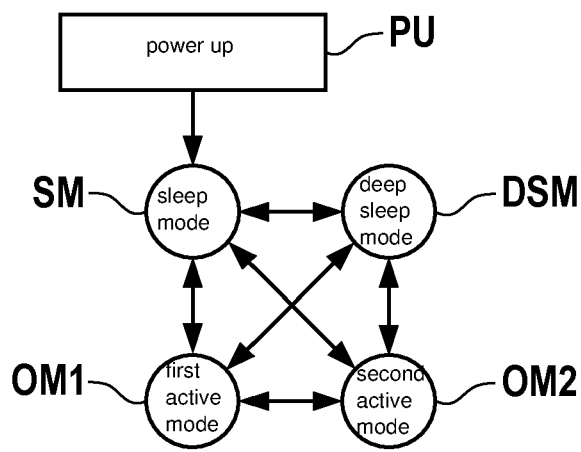
FIG. 5 shows operating modes of a sensor element according to a specific embodiment of the present invention in schematic form.

FIG. 5 shows operating modes of a sensor element according to a specific embodiment of the present invention in schematic form.

In FIG. 5, operating modes of a sensor system 1 according to a specific embodiment of the present invention are shown in schematic form. After being supplied with electrical energy, sensor system 1 is started up, which is also known as a power-up PU, and then is initially operated in a sleep mode SM. In addition to sleep mode SM, sensor system 1 may be operated in an additional deep sleep mode DSM as an operating mode and in two different active modes OM1, OM2. Moreover, it is possible to switch between the individual operating modes as desired, so that, for instance, it is possible to switch from deep sleep mode DSM to second active mode OM2 or from sleep mode SM to deep sleep mode DSM and from deep sleep mode DSM to first active mode OM1. The switch between the individual modes is able to be set by a predefined configuration-bit field in a respective register of sensor system 1, for example, or also in configuration data memory 100. Alternatively, corresponding configuration bits may also be stored in non-volatile memory 24. They are then able to be read out or modified via interface 51 with the aid of processing unit 7. To this end, sensor system 1 may be developed to check on a regular basis whether or not the stored value allocated to the respective operating mode has changed. If it has changed, then a corresponding change of the operating mode will be initiated accordingly. For example, if a change from an active mode OM1 to a sleep mode SM is initiated, parts to be switched off that are allocated to sleep mode SM are switched off. When they are finally switched off, this is able to be communicated to external processing unit 7 via interface 51 as a confirmation, as the case may be.

In summary, at least one specific embodiment of the present invention has at least one of the following advantages:

a reduced power consumption a simple implementation reduced time until a dedicated application of the sensor is started a reduction in the time of the communication of the sensor with a user.

Although the present invention has been described on the basis of preferred exemplary embodiments, it is not restricted to these exemplary embodiments but may be modified in a variety of ways.

What is claimed is:

1. A sensor system, comprising:
   at least one sensor element configured to sense at least one measured variable in the form of electrical sensor signals;
   a circuit system configured to operate the at least one sensor element and to generate sensor data based on the sensor signals; and
   at least one configuration data memory storing configuration data;
   wherein the sensor system is alternatively operable in different operating modes, the different operating modes including at least: (i) an active mode in which sensor data are generated, and (ii) a sleep mode in which no sensor data are generated and at least one part of the sensor system is switched to a currentless state,
   wherein the circuit system is configured so that memory content of the at least one configuration data memory is independent of the operating modes of the sensor system, so that the stored configuration data are maintained in a sleep mode,
   wherein the sensor system is configured so that the at least one part that is switched to a currentless state in the sleep mode is reconfigured based on the stored configuration data when a change to the active mode is initiated,
   wherein a digital part is switchable and includes a digital core, which is connected to a microcontroller, a digital signal processor, a sensor data memory, and a non-volatile memory,
   wherein the sensor system is operable in at least two sleep modes, which differ from each other by respective parts of the circuit system that are switchable to a currentless state, wherein in at least one of the sleep modes, an analog part of the circuit system is switched to a currentless state,
   wherein the configuration data for configuring the sensor system are stored in a volatile memory of the another digital part of the circuit system, wherein the at least one configuration data memory of the another digital part is not switchable and is always provided with energy,
   wherein when the sensor system is in the sleep mode and the analog part and the digital part are switched off, a user sends a wake-up signal and a signal for starting the active mode with an external processing unit to the sensor system, wherein the sensor system receives the signals via at least one interface and switches the analog part and the digital part on so that they are supplied with energy in a first time period,
   wherein while the analog part and the digital part are switched on, they are configured using the configuration data from the configuration data memory, wherein the sensor system is next operated in the active mode and carries out measurements with the sensor element, and
   wherein since the active mode is automatically started immediately thereafter, the first time period required for interacting with the external processing unit is reduced, and wherein an external configuration of the sensor system by the user is not required because the configuration data are held in readiness during the sleep mode.

2. The sensor system as recited in claim 1, further comprising: wherein the at least one interface communicates with an external processing device, wherein user-specific and/or application-specific configuration data are optionally writable to the at least one configuration data memory via the interface independently of the operating modes.

3. The sensor system as recited in claim 2, wherein the interface is connected to the circuit system, and using the interface, a change in the operating mode is able to be initiated by an external processing unit.

4. The sensor system as recited in claim 3, wherein the circuit system is configured so that information about the operating mode in which the sensor system is operated is transmittable to the external processing device via the interface.

5. The sensor system as recited in claim 2, wherein the interface is a I2C interface or a SPI interface or a I3C interface.

6. The sensor system as recited in claim 1, wherein the circuit system is configured so that the active mode is started when a change from the sleep mode to the active mode is initiated.

7. The sensor system as recited in claim 1, wherein the sensor system is operated in at least two active modes, which include a continuous operating mode and/or an operating-cycle mode.

8. The sensor system as recited in claim 1, wherein the sensor element is a micromechanical sensor element, the micromechanical sensor element being configured to sensor: (i) a pressure, and/or (ii) an acceleration, and/or (iii) rate of rotation, and/or (iv) orientation in space, and/or (v) temperature, and/or (vi) humidity, and/or (vii) gas composition and/or (viii) particle concentration.

9. The sensor system as recited in claim 1, wherein the circuit system is configured to provide multiple sleep modes and/or multiple active modes for operating the sensor system, which differ from one another by energy consumption.

10. The sensor system as recited in claim 1, wherein the sensor system draws less than two microamperes in at least one sleep mode, in a temperature range of at least 0° C. -65° C.

11. A method for operating a sensor system, the method comprising:
    switching at least one part of the sensor system to a currentless state in the sleep mode, wherein the sensor system includes at least one sensor element to sense at least one measured variable in the form of electrical sensor signals, a circuit system to operate the at least one sensor element and to generate sensor data based on the sensor signals, and at least one configuration data memory storing configuration data,
    wherein the sensor system is alternatively operable in different operating modes, including at least one of: (i) an active mode in which sensor data are generated, and (ii) a sleep mode in which no sensor data are generated and at least one part of the sensor system is switched to a currentless state, and
    wherein the circuit system is configured so that: (i) memory content of the at least one configuration data memory is independent of the operating modes of the sensor system, so that the stored configuration data are maintained in a sleep mode, and (ii) the at least one part that is switched to a currentless state in the sleep mode is reconfigured based on the stored configuration data when a change to the active mode is initiated; and
    reconfiguring the at least one part using the configuration data stored in the configuration data memory when a change is initiated from the sleep mode to the active mode;

wherein a digital part is switchable and includes a digital core, which is connected to a microcontroller, a digital signal processor, a sensor data memory, and a non-volatile memory, wherein the sensor system is operable in at least two sleep modes, which differ from each other by respective parts of the circuit system that are switchable to a currentless state, wherein in at least one of the sleep modes, an analog part of the circuit system is switched to a currentless state, wherein the configuration data for configuring the sensor system are stored in a volatile memory of the another digital part of the circuit system, wherein the at least one configuration data memory of the another digital part is not switchable and is always provided with energy, wherein when the sensor system is in the sleep mode and the analog part and the digital part are switched off, a user sends a wake-up signal and a signal for starting the active mode with an external processing unit to the sensor system, wherein the sensor system receives the signals via the interface and switches the analog part and the digital part on so that they are supplied with energy in a first time period, wherein while the analog part and the digital part are switched on, they are configured using the configuration data from the configuration data memory, wherein the sensor system is next operated in the active mode and carries out measurements with the sensor element, and wherein since the active mode is automatically started immediately thereafter, the first time period required for interacting with the external processing unit is reduced, and wherein an external configuration of the sensor system by the user is not required because the configuration data are held in readiness during the sleep mode.

12. The method as recited in claim 11, wherein after the reconfiguration of the at least one part of the sensor system, the sensor system is operated in the active mode.

* * * * *